United States Patent
Heres et al.

(10) Patent No.: US 8,753,420 B2
(45) Date of Patent: Jun. 17, 2014

(54) METHOD FOR SELECTIVELY RECOVERING AMERICIUM FROM A NITRIC AQUEOUS PHASE

(75) Inventors: Xavier Heres, Avignon (FR); Pascal Baron, Bagnois sur Ceze (FR); Christian Sorel, Villeneuve-les-Avignon (FR); Clément Hill, Saint Victor la Coste (FR); Gilles Bernier, Avignon (FR)

(73) Assignees: Commissariat a l'Energie Atomique et aux Energies Alternatives, Paris (FR); Areva NC, Paris (FR)

( * ) Notice: Subject to any disclaimer, the term of this patent is extended or adjusted under 35 U.S.C. 154(b) by 313 days.

(21) Appl. No.: 13/386,017

(22) PCT Filed: Jul. 26, 2010

(86) PCT No.: PCT/EP2010/060770
§ 371 (c)(1),
(2), (4) Date: Mar. 6, 2012

(87) PCT Pub. No.: WO2011/012563
PCT Pub. Date: Feb. 3, 2011

(65) Prior Publication Data
US 2012/0152059 A1   Jun. 21, 2012

(30) Foreign Application Priority Data
Jul. 27, 2009 (FR) .................................. 09 55239

(51) Int. Cl.
C22B 60/00 (2006.01)
B01D 15/00 (2006.01)
B01D 37/00 (2006.01)
B01D 61/00 (2006.01)
C01G 56/00 (2006.01)

(52) U.S. Cl.
USPC ................. 75/393; 210/639; 210/767; 423/3; 423/8; 423/9

(58) Field of Classification Search
USPC .................. 75/393; 210/639, 767; 423/3, 8–9
See application file for complete search history.

(56) References Cited

U.S. PATENT DOCUMENTS

| 5,609,745 | A | 3/1997 | Adnet et al. |
| 5,708,958 | A * | 1/1998 | Koma et al. .................. 423/8 |
| 7,157,003 | B2 | 1/2007 | Baron et al. |
| 2004/0124141 | A1* | 7/2004 | Baron et al. ............ 210/634 |
| 2007/0009410 | A1 | 1/2007 | Modolo et al. |

FOREIGN PATENT DOCUMENTS

| WO | WO 2007/135178 | 11/2007 |
| WO | 2008/088576 A | 7/2008 |

OTHER PUBLICATIONS

Weaver et al., *Talspeak: A New Method of Separating Americum and Curium From The Lanthanides by Extraction From an Aqueous Solution of an Aminopolyacetic Acid Complex With a Monoacidic Organophosphate or Phosphonate*. Chemical Technology Division, Chemical Development Section C, Aug. 1964.

(Continued)

Primary Examiner — Keith Walker
Assistant Examiner — Alexander Polyansky
(74) Attorney, Agent, or Firm — Knobbe, Martens, Olson & Bear, LLP (57) ABSTRACT

A method with which americium may be selectively recovered from a nitric aqueous phase containing americium, curium and fission products including lanthanides and yttrium, but which is free of uranium, plutonium and neptunium or which only contains these three last elements in trace amounts. The method is applicable for treatment and recycling of irradiated nuclear fuels, in particular for removing americium from raffinates stemming from methods for extracting and purifying uranium and plutonium such as the PUREX and COEX™ methods.

25 Claims, 2 Drawing Sheets (56) References Cited

OTHER PUBLICATIONS

Baron et al., *Separation of the Long Lived Radionuclides: Current Status and Future R&D Programs in France.* Global 2003, Nov. 16-20, 2003.

French Search Report, Feb. 26, 2010, FR 0955239.

Madic et al, "Futuristic back-end of the nuclear fuel cycle with the partitioning of minor actinides". Journal of Alloys and Compounds, Elsevier Sequoia, vol. 444-445, pp. 23-27, 2007.

International Search Report and Written Opinion dated Nov. 3, 2010 for PCT Application No. PCT/EP2010/060770 filed Jul. 26, 2010.

* cited by examiner

METHOD FOR SELECTIVELY RECOVERING AMERICIUM FROM A NITRIC AQUEOUS PHASE

RELATED APPLICATIONS

This application is a U.S. National Phase of International Application No. PCT/EP2010/060770, filed Jul. 26, 2010, designating the U.S., and published in French as WO 2011/012563 on Feb. 3, 2011 which claims the benefit of French Patent Application No. 0955239 filed Jul. 27, 2009.

BACKGROUND OF THE INVENTION

1. Field of the Invention

The present invention relates to a method which allows selective recovery of americium from a nitric aqueous phase containing americium, curium and fission products including lanthanides, but which is free of uranium, plutonium and neptunium and which only contains these three last elements in trace amounts.

This method finds applications in the field of processing and recycling irradiated nuclear fuels where it has a most particular advantage for removing americium from raffinates stemming from processes for extracting and purifying uranium and plutonium such as the PUREX and COEX™ methods.

2. Description of the Related Art

The methods, which allow extraction and purification of uranium and plutonium present in liquors for dissolving irradiated nuclear fuels like the PUREX method (which is presently used in factories for processing irradiated nuclear fuels) and the COEX™ method (which is described in the international PCT application WO 2007/135178, [1]), generate effluents to which the name of raffinates is given.

These raffinates are aqueous solutions with strong nitric acidity, typically from 2 to 5 M, which contain americium, curium, lanthanides such as lanthanum, cerium, praseodymium, neodymium, samarium and europium, fission products other than lanthanides such as molybdenum, zirconium, rubidium, ruthenium, rhodium, palladium, and yttrium, as well as other metal elements which are neither lanthanides nor fission products, such as iron and chromium.

Americium is the main contributor to residual radioactivity after 300 years of waste stemming from the packaging of these raffinates (notably by vitrification). As an illustration, the time required for this radioactivity to return to a level of the same order as that of natural uranium used for making nuclear fuels is about ten thousand years.

Selective recovery of the americium present in raffinates stemming from the PUREX and COEX™ methods, before the latter are sent to vitrification, would allow significant reduction in the thermal load of the vitrified waste and consequently in the storage footprint of this waste.

In the irradiated fuel, after 5 years of cooling, 90% of curium is in the form of Cm-244, having a radioactive period of 18 years. The other isotopes Cm-243, Cm-245, Cm-246, with a period of more than 30 years only represent 10% of the isotopy of curium. As curium is a neutron emitter, making its handling delicate, and since Cm-244 leads to Pu-239 by decay with a period of less than 30 years, it proves to be more advantageous not to directly recycle curium with americium.

In order to recover americium from an aqueous phase, a certain number of methods have been suggested.

The SESAME method is notably one of them.

This method, which is described in French patent No. 2 731 717, [2], provides oxidation of americium via an electrochemical route—which is stable in an aqueous solution with a degree of oxidation III—into americium(VI) by using an electrochemical mediator, the role of which is to promote formation of americium(VI) on the one hand and a complexing agent on the other hand, the role of which is to stabilize americium(VI) in an aqueous solution. Hexavalent americium may then be selectively extracted from the aqueous phase, in which it is found, with an organic phase containing a solvating extractant such as tri-n-butyl phosphate (or TBP), or an acid extractant such as bis-2-ethylhexyl phosphoric acid (or HDEHP).

The use of the SESAME method for selectively recovering americium from raffinates stemming from the PUREX and COEX™ methods cannot be contemplated for the simple reason that the presence of oxidizable fission products significantly alters the electrochemical oxidation yield of the americium and therefore the yield for extracting this element with the organic phase. This is moreover the reason for which this method was suggested and used up to now for treating aqueous solutions only containing americium, curium and possibly lanthanides like those stemming from the SANEX and DIAMEX methods.

Moreover, there is the TALSPEAK method.

This method, which is described by B. Weaver and F. A. Kappelmann in the Report ORNL-3559, 1964, [3], makes provision for achieving an americium-curium partition after having separated both elements from the lanthanides and other fission products. To do this, it uses an organic phase consisting of a TBP/HDEHP mixture in an aromatic diluent of the toluene or di-isopropylbenzene type, and an aqueous phase containing a polyaminocarboxylic acid/hydroxycarboxylic acid mixture and the pH of which is adjusted to a value from 2 to 3 by adding a base.

Applied to the processing of a raffinate stemming from a PUREX or COEX™ method, the TALSPEAK method would require reduction in the acidity of this raffinate in order to return its pH to a value above 1 with, as a result, a non-negligible risk of hydrolysis of the fission products present in the raffinate, which may lead to the formation of insoluble products, for example containing zirconium, molybdenum or ruthenium.

Moreover, in the TALSPEAK method, the separation of americium and of curium from the fission products can only be obtained with an organic phase comprising an aromatic diluent, while the PUREX and COEX™ methods use an aliphatic diluent.

The result of this is that the application of the TALSPEAK method downstream from a PUREX or COEX™ method can no longer be contemplated.

Further there is the ALINA method.

This method, which is described in patent application US No. 2007/0009410, [4], provides extraction of americium from an aqueous phase containing curium and possibly other elements such as lanthanides, by using an organic phase consisting of a synergistic (chlorophenyl) acid/tri(ethylhexyl) phosphate or (chlorophenyl)dithio-phosphinic acid/trialkylphosphinic oxide mixture in i-octane and t-butylbenzene. The selectivity of this mixture would be sufficient for selectively extracting americium from an aqueous phase containing from 0.1 to 0.5 mol/L of nitric acid.

The application of this method to the processing of a raffinate stemming from a PUREX or COEX™ method would require, as in the case of the TALSPEAK method, reduction of the nitric acid content of this raffinate so as to bring it back to a maximum value of 0.5 mol/L if the intention is to obtain sufficient extraction and separation performances, with, there again, a risk of hydrolysis of the fission products present in the raffinate and therefore of formation of insoluble products.

Moreover, the organic phase used in the ALINA method may strongly extract certain fission products such as zirconium, molybdenum, ruthenium and palladium, which has the effect of reducing the loading capacity and the extracting power of this phase with regard to americium and of notably complicating the method if the intention is to then recover the americium alone in a suitable aqueous phase.

Further, the organic phase used in the ALINA method comprises four constituents, one of which leads to degradation products containing sulfur or chlorine atoms, which are difficult to handle in an industrial process in the nuclear field because of the risk of formation of sulfuric or hydrochloric acid. The presence of these four constituents considerably complicates the processing of the degraded organic phase which moreover has not been the subject of studies to this day.

Further, there is the DIAMEX 2 method.

This method described in [5], makes provision for extracting the americium from an aqueous phase containing curium by using an organic phase consisting of DMDOHEMA malonamide in TPH. The selectivity of this molecule would be sufficient in at least 1.7 mol/L nitric medium, for extracting more than 99% of the americium while leaving 99% of the curium in the aqueous phase, according to a test applied on a reformed solution in 2002. If this method has the advantage of being able to process a strongly acid solution, it requires downstream extraction cycles with other organic solutions, in order to obtain in fine an aqueous solution only containing americium and curium, which complicates the overall picture.

Finally there is the DIAMEX-SANEX method.

This method was proposed in French patent No. 2 845 616, [6] for separating actinides with a degree of oxidation of III, i.e. americium and curium, from lanthanides downstream from a PUREX method.

This method is based on the use of two extractants operating in separate chemical domains, i.e.: a first extractant of the solvating type, which is capable of extracting together the actinides(III) and lanthanides from an aqueous phase with strong nitric acidity, and a second extractant of the acid type, which is capable of extracting lanthanides from an aqueous phase with low nitric acidity.

This method schematically consists of co-extracting the actinides(III) and lanthanides from the aqueous phase, a strongly acid phase, in which they are found, by means of an organic phase containing the solvating extractant and then, after having added the acid extractant to the organic phase, of de-extracting the actinides(III) from this organic phase by means of a weakly acid aqueous solution. The acid extractant then allows the lanthanides to be retained in the organic phase and to thereby avoid that the latter are de-extracted together with the actinides(III).

Now, it turns out that within the scope of their work, the Inventors surprisingly noticed that the use of two extractants operating in separate chemical domains may also be exploited for selectively recovering americium from a nitric aqueous phase containing, in addition to this element, curium and fission products including lanthanides, provided that the first extractant is suitably selected on the one hand and that certain of the operating conditions under which this use is made, are suitably selected on the other hand.

And it is on this observation that the present invention is based.

SUMMARY OF THE INVENTION

It is recalled, in the field of liquid-liquid extractions, i.e. using the solubility difference of chemical elements which one seeks to separate between an aqueous phase and an organic phase:

the distribution coefficient between both organic and aqueous phases of a metal element M, noted as $D_M$, corresponds to the ratio between the concentration (or activity) which this element has in the organic phase and the concentration which this same element has in the aqueous phase;

the extraction factor of a metal element M, noted as $E_M$, corresponds to $O/A*D_M$, i.e. to the product of the ratio between the volume or flow rate (if the phases which are in presence of each other, are circulating phases) of the organic phase and the volume or flow rate of the aqueous phase by the distribution coefficient $D_M$ of this same element; while the separation factor between two metal elements M1 and M2, noted as $FS_{M1/M2}$ corresponds to $D_{M1}/D_{M2}$, i.e. to the ratio between the distribution coefficient of the element M1 and the distribution coefficient of the element M2.

The object of the present invention is therefore a method for selectively recovering americium from an aqueous phase A1 which contains at least 0.5 mol/L of nitric acid, americium, curium and fission products including lanthanides, but which is free of uranium, plutonium and neptunium or which only contains these three last elements in trace amounts, which method is characterized in that it comprises at least the steps:

a) extracting the americium and a part of the lanthanides from the A1 aqueous phase, by circulating this aqueous phase in a first extractor, as a counter-current to an organic phase non-miscible with water, which contains a solvating extractant capable of further extracting the americium than the curium from an acid aqueous phase, and possibly an acid extractant, in an organic diluent;

b) washing the organic phase stemming from step a), by circulating this organic phase in a second extractor, as a counter-current to an A2 aqueous phase which contains at least 0.5 mol/L of nitric acid;

c) optionally adding to the organic phase stemming from step b) the acid extractant if the latter is not already present in this phase;

d) selectively de-extracting the americium present in the organic phase stemming from step b) or from step c), by circulating this organic phase in a third extractor, as a counter-current to an A3 aqueous phase which has a pH at least equal to 1 and which contains one or more complexing agents; and e) de-extracting the lanthanides present in the organic phase stemming from step c), by circulating this organic phase in a fourth extractor, as a counter-current to an A4 aqueous phase which contains less than 1.5 mol/L of nitric acid;

and in that the ratio between the flow rates at which the organic phase and the A1 aqueous phase circulate in the first extractor and the ratio between the flow rates at which the organic phase and the A2 aqueous phase circulate in the second extractor are selected so that the extraction factor of the americium obtained in each of the steps a) and b) is greater than 1 and that the extraction factor of the curium obtained in each of the steps a) and b) is less than 1.

Thus, in the method of the invention, a solvating extractant and an acid extractant are used like in the DIAMEX-SANEX method, but:

on the one hand, the solvating extractant is selected from solvating extractants which are capable of more extracting the americium than the curium from an acid aqueous phase, i.e. those with which the distribution coefficient of the americium obtained during an extraction is always greater than the distribution coefficient of the curium obtained during the same irradiation and this regardless of the operating conditions under which this extraction is carried out, and on the other hand, the ratios between the flow rates at which the organic and aqueous phases circulate in the extractors dedicated to steps a) and b) are adjusted so as to obtain in each of these steps, an extraction factor greater than 1 for americium and an extraction factor less than 1 for curium, by which it is possible to separate both of these elements from each other during said steps a) and b), the americium being found in the organic phase while the curium remains in the aqueous phase.

According to the invention, the solvating extractant may notably be selected from:

malonamides such as N,N'-dimethyl-N,N'-dibutyltetradecylmalonamide (or DMDBTDMA), N,N'-dimethyl-N,N'-dioctylhexylethoxymalonamide (or DMDOHEMA), N,N'-dimethyl-N,N'-dioctyloctylmalonamide (or DMDOOMA), N,N'-dimethyl-N,N'-dioctylhexyl-malonamide (or DMDOHMA) or N,N'-dimethyl-N,N'-dibutyldodecylmalonamide (or DMDBDDEMA);

carbamoylphosphine oxides such as diisobutylphenyloctylcarbamoylmethylphosphine oxide (or CMPO);

triisobutylphosphine sulfides;

carbamoylphosphonates such as dihexyl-N,N-diethylcarbamoylmethylphosphonate (or DHDECMP); and mixtures thereof.

The acid extractant (designated in this way since it has one or more acid functions) may itself notably be selected from:

acids containing phosphorus, such as mono- and di-alkylphosphoric acids such as di(2-ethyl-hexyl)phosphoric acid (or HDEHP), di(n-hexyl)phosphoric acid (or HDHP), di(1,3-dimethylbutyl)phosphoric acid (or HBDMBP) or diisodecylphosphoric acid (or DIDPA), mono- and di-alkylphosphonic acids such as 2-ethyl-hexyl-2-ethylhexylphosphonic acid (or HEHEHP), mono- and di-alkylphosphinic acids, thiophosphoric acids, thiophosphonic acids and thiophosphinic acids;

liphophilic carboxylic acids;

sulfonic acids such as dinonyl-naphthalene sulfonic acid (or HDNNS); and mixtures thereof.

As for the organic diluent, it may be selected from polar or aliphatic organic diluents, the use of which has been suggested for achieving liquid-liquid extractions in the field of the processing of irradiated nuclear fuels, such as toluene, xylene, t-butyl-benzene, triisopropylbenzene, kerosene, dodecanes, either linear or branched such as n-dodecane or hydrogenated tetrapropylene (or TPH), isane, a normal paraffinic hydrocarbon (or NPH), metanitrobenzotrifluoride and 5,5'-[oxybis-(methyleneoxy)]bis(1,1,2,2,3,3,4,4-octafluoropentane).

According to the invention, one or more complexing agents are preferably added to the aqueous phases A1 and A2 with view to:

either enhancing the separation factor between americium and curium noted as $FS_{Am/Cm}$, during steps a) and b);

or avoiding migration into the organic phase of certain fission products which are not lanthanides but which are capable of being extracted with the solvating extractant such as for example palladium and zirconium;

or further obtaining both of these conjugate effects.

This(these) complexing agent(s) which should be capable, when they are in an aqueous phase with high acidity, i.e. in practice with a pH<0, of complexing the curium preferentially over the americium and/or strongly complexing the fission products which one does not want to see migrate into the organic phase, may notably be selected from:

carboxylic acids such as oxalic acid, malonic acid or mesoxalic acid (also known under the name of ketomalonic acid);

hydroxycarboxylic acids such as glycolic acid, citric acid or tartaric acid;

polyaminocarboxylic acids such as N-(2-hydroxyethyl) ethylene diamine triacetique (or HEDTA), nitrilotriacetic acid (or NTA) or diethylene triamine pentaacetic acid (or DTPA);

pyridine polycarboxylic acids such as dipicolinic acid (or DPA, further known as 2,6-pyridine dicarboxylic acid);

diglycolamides such as tetraethyldiglycolamide (or TEDGA), tetramethyldiglycolamide (or TMDGA) or tetrapropyldiglycolamide (or TPDGA);

amines, polyazines grafted with alkyl chains including from 1 to 8 carbon atoms, hydroxy-oximes, hydroxamic acids and β-diketones.

As indicated earlier, one or more complexing agents are also present in the A3 aqueous phase which is used in step d) for selectively de-extracting the americium from the organic phase which either stems from step b) in the case when the acid extractant is present in the organic phase as soon as step a), or from step c) in the opposite case.

This or these complexing agent(s), which have to be capable, when they are in an aqueous phase with low acidity, i.e. in practice with pH≥1, of complexing the americium preferentially over the lanthanides, may notably be selected from:

carboxylic acids such as oxalic acid, malonic acid or mesoxalic acid;

hydroxycarboxylic acids such as glycolic acid, citric acid or tartaric acid;

polyaminocarboxylic acids such as HEDTA, NTA or DTPA;

pyridine polycarboxylic acids such as DPA;

hydrophilic polypyridines;

amines, polyazines grafted with alkyl chains including from 1 to 8 carbon atoms.

The A4 aqueous phase which is used during step e) for de-extracting the lanthanides from the organic phase may be free of any complexing agent, in which case this is a simple solution of nitric acid, the acidity of which is advantageously included in the range of acidities for which the extracting power of the organic phase is minimum with regard to lanthanides and preferably at a concentration of less than 1.5 mol/L.

However, it is also possible to add to this solution, one or more complexing agents of the type: carboxylic acids, hydroxycarboxylic acids, polyaminocarboxylic acids, diglycolamides, sulfonic acids, phosphoric acids or polyazines grafted with alkyl chains including from 1 to 8 carbon atoms, notably if de-extraction of the organic phase is also desired in step e), metal elements such as zirconium and iron which, although they are not lanthanides, have been extracted from the A1 aqueous phase in step a) and have then remained in the organic phase.

In a first method for applying the method of the invention, the acid extractant is only added to the organic phase after step b).

Step a) is therefore carried out by using an organic phase which only contains the solvating extractant as an extractant, and the method comprises all the steps a) to e).

In this case, step c) is preferably carried out by circulating in the third extractor an organic phase which, not only contains the same solvating extractant as the one present in the organic phase used in step a), at the same concentration and in the same organic diluent, but which further contains the acid extractant, this phase will be added in said third extractor to the organic phase from step b).

In this case also, step e) is preferably followed by an additional step which consists of separating the solvating extractant from the acid extractant with view to their subsequent re-use.

The separation of both extractants may be achieved by any of the operations described in the aforementioned reference [6], i.e.:
- by de-extraction of one of the two extractants from the organic phase;
- by distillation of the extractant having the lowest vaporization point if both extractants have sufficiently different vaporization points;
- by cryogenic solidification of the extractant having the highest solidification point if both extractants have solidification points which are sufficiently far from each other.
- or further, by demixing, i.e. by inducing the formation of two organic phases non-miscible with each other, each strongly enriched in one of the two extractants.

According to the invention, the separation of both extractants is preferably achieved by an operation leading to the removal of the acid extractant from the organic phase from step e) and to maintaining the solvating extractant in this phase.

Actually, to the extent that:
- it is desirable that the industrial application of the method of the invention for treating a raffinate be accomplished in the form of a succession of cycles each allowing treatment of one volume of this raffinate, on the one hand,
- the organic phase also comprises an organic diluent on the other hand, and that
- finally, the solvating extractant and this diluent are intended to be used as soon as the first step of a cycle, it is preferable that they may remain associated with each other from the beginning to the end of this cycle.

This notably allows simplification of the handling of the organic diluent, comparatively with a separation of both extractants which would lead to maintaining the acid extractant in the organic phase and which would impose secondary separation of this acid extractant from the organic diluent and recovery of the latter in order to again dissolve the solvating extractant therein.

The selective removal of the acid extractant from the organic phase is preferably achieved by de-extracting this extractant.

At the end of this removal, the organic phase is then subject to a purification step, which may comprise, as this is well known per se, washing of this phase with one or more aqueous phases capable of de-extracting the impurities and degradation products which it contains without however de-extracting the solvating extractant, and one or more operations for filtering the thereby washed organic phase if the latter contains a precipitate.

Advantageously, the organic phase from this purification is divided into two fractions: a first fraction which is intended to only comprise the solvating extractant and the organic diluent with view to its reuse in step a) of the next cycle, and a second fraction in which the acid extractant is re-extracted with view to its reuse in step c) of the next cycle.

It is thus possible to limit at best the volumes of consumed extractants as well as the volumes of produced organic effluents and in turn to lower the operating costs of the method.

According to a second embodiment of the method of the invention, the acid extractant is present in the organic phase as soon as step a).

Step a) is therefore carried out by using an organic phase which contains both the solvating extractant and the acid extractant, and the method neither comprises the step c), nor the step for separating both extractants.

On the other hand, it advantageously comprises after step e) a step for purifying the organic phase in order to remove therefrom the impurities and degradation products which have accumulated during the previous steps and this with view to its reuse in the next cycle.

This purification step may, as previously, comprise one or more washing operations with aqueous solutions and optionally one or more filtration operations.

If this second embodiment has the advantage of setting into play fewer operations than in the previous embodiment, it is however found that certain metal elements such as molybdenum, zirconium and iron, which are not extractable from an aqueous phase of strong acidity with an organic phase only containing a solvating extractant, become extractable when this organic phase also contains an acid extractant.

The result of this is that the presence in the organic phase of the acid extractant as soon as step a) leads to the extraction of these metal elements from the A1 aqueous phase during this step and to their being maintained in the organic phase during step b).

Also, in this second embodiment, the method advantageously comprises an additional step which consists of selectively de-extracting from the organic phase the molybdenum, for example by means of an aqueous phase of low acidity, i.e. typically with a pH of 3, and containing a complexing agent capable of selectively complexing the molybdenum such as citric acid.

This additional step is preferably carried out between step b) and step d), step c) being inexistent in this case.

As indicated earlier, zirconium and iron as for them may be de-extracted from the organic phase in step e), together with the lanthanides, by adding to the A4 aqueous phase one or more carefully selected complexing agents.

According to the invention, it is preferred to use:
- a malonamide as a solvating extractant such as DMDOHEMA, because of the particularly marked capacity which this type of extractant has of more extracting americium than curium from an aqueous phase with strong nitric acidity;
- an acid containing phosphorus as an acid extractant and more particularly a dialkyl phosphoric acid such as HDHP or HDEHP, notably in the case when the acid extractant is present in the organic phase as soon as step a); indeed, this type of extractant is then capable of playing a role of a phase modifier and of significantly raising the acidity value of the phase A1 for which demixing (i.e. the occurrence of a third phase consecutive to saturation with metal species of the organic phase) is likely to occur and in turn the loading capacity of the organic phase; and
- an aliphatic diluent as an organic diluent and more particularly TPH which is the diluent used in the PUREX method presently applied in the factories for processing irradiated nuclear fuels.

Moreover, it is preferred that the A1 aqueous phase have a nitric acid content from 2 to 6 mol/L and contain one or more complexing agents which are preferably selected from hydroxycarboxylic acids, polyaminocarboxylic acids, and diglycolamides, the use of a hydrophilic diglycolamide such as TEDGA being more preferred.

Indeed, because they complex much more strongly the curium than the americium in a nitric aqueous phase, hydrophilic dyglycolamides give the possibility of significantly enhancing the separation factor between americium and curium, $FS_{Am/Cm}$, in step a). Further they also allow enhancement of the separation factors between americium and heavy lanthanides such as samarium, europium and gadolinium, between americium and yttrium and between americium and zirconium.

Advantageously, the diglycolamide present in the A1 aqueous phase is associated with a polyaminocarboxylic acid such as HEDTA or DTPA, which itself allows inhibition of the extraction of palladium by the organic phase.

However, the A1 aqueous phase may also contain as a complexing agent, a carboxylic acid such as oxalic acid, which itself allows inhibition of the extraction of molybdenum, zirconium and iron in the case when the organic phase does not contain the dialkylphosphoric acid as soon as step a).

As regards the A2 aqueous phase, the use of a solution having a nitric acid content from 2 to 6 mol/L and preferably containing the same complexing agent(s) as those present in the A1 aqueous phase in the same ranges of concentrations, is preferred.

The A3 aqueous phase is itself preferably a solution containing a polyaminocarboxylic acid such as HEDTA or DTPA, as well as a carboxylic or hydroxycarboxylic acid capable of playing both the role of a complexing agent and that of a buffer for glycolic acid, and the pH of which is adjusted to a value from 2 to 4 by adding a base of the hydroxide type such as soda or hydrazine, of the carbonate type such as sodium carbonate, or further of the amine or hydroxylamine type.

As for the A4 aqueous phase, a solution is preferably used, containing from 0.5 to 1.5 mol/L of nitric acid and a diglycolamide such as TEDGA, alone or associated with a carboxylic acid such as oxalic acid.

According to the invention, the ratio between the flow rates at which the organic phase and the A1 aqueous phase circulate in the first extractor and the ratio between the flow rates at which the organic phase and the A2 aqueous phase circulate in the second extractor are preferably selected so that the obtained americium extraction factor at each of steps a) and b) is greater than or equal to 1.40 and that the obtained curium extraction factor at each of the steps a) and b) is itself less than or equal to 0.90.

It is thus possible to reduce the number of stages which the extractors have to include, in which steps a) and b) are carried out for obtaining satisfactory separation of americium and curium during these steps.

The method according to the invention has many advantages. In particular:
  it allows recovery of americium from a nitric aqueous phase with a recovery level at least equal to 99.90% or even 99.95%;
  it does not set into play any oxidation-reduction reaction of americium or of any other metal elements and therefore does not comprise any of the drawbacks related to such a reaction;
  the organic phase which it uses does not comprise any constituent capable of leading to chlorinated degradation products, difficult to handle in the nuclear field;
  the organic phase may comprise an aliphatic diluent; and
  it may be applied to the treatment of aqueous phases with high nitric acidity without it being necessary to reduce the acidity of these phases.

For all these reasons, it is most particularly advantageous for removing americium from raffinates stemming from methods for extracting and purifying uranium and plutonium such as the PUREX and COEX™ methods.

Other characteristics and advantages of the method of the invention will become apparent from the examples which follow, which relate to exemplary embodiments of this method and which refer to the appended figures.

Needless to say that these examples are only given as illustrations of the object of the invention and should by no means be interpreted as a limitation of this object.

Figure 1:
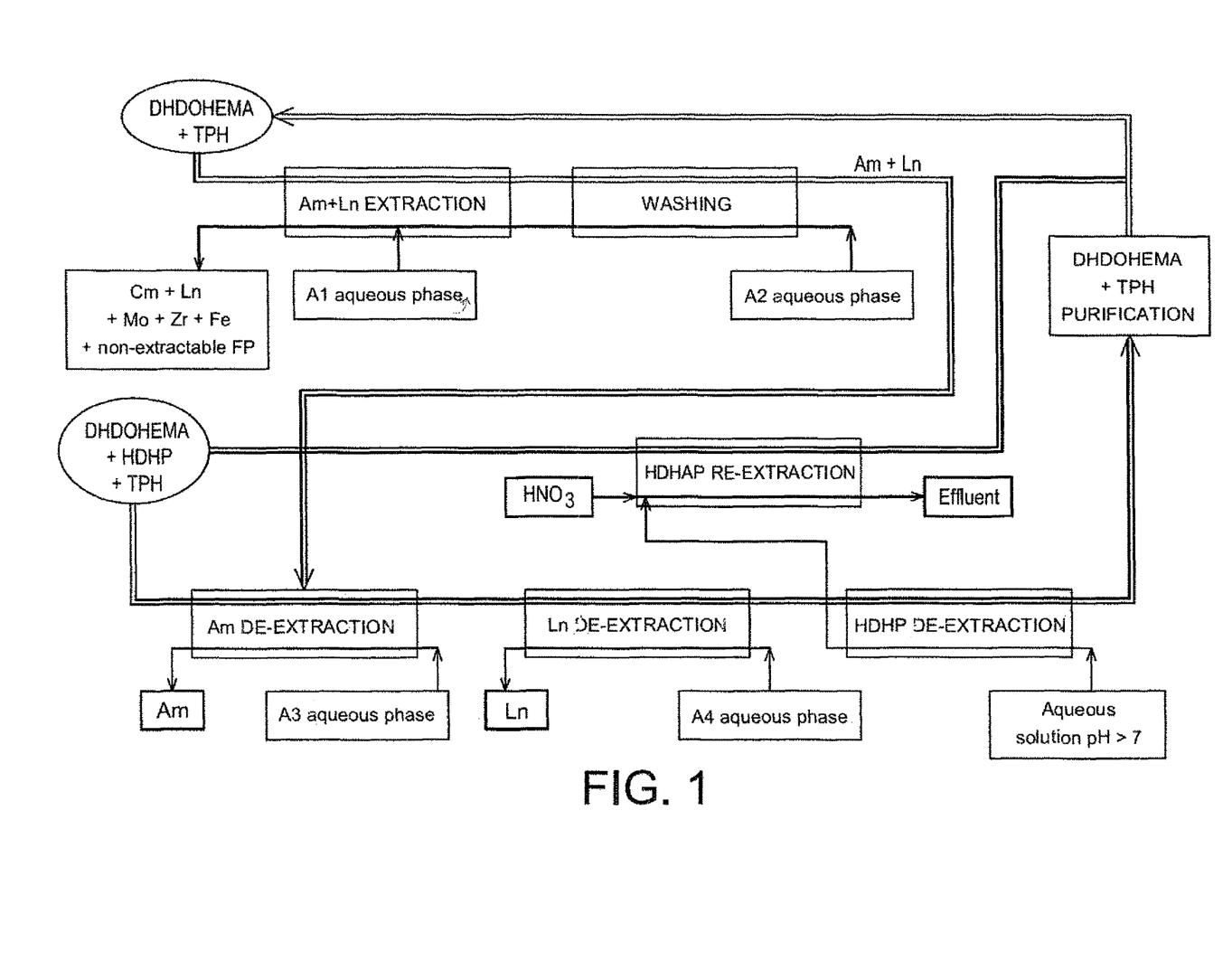
FIG. 1 is a block diagram of a first exemplary embodiment of the method of the invention.
Figure 2:
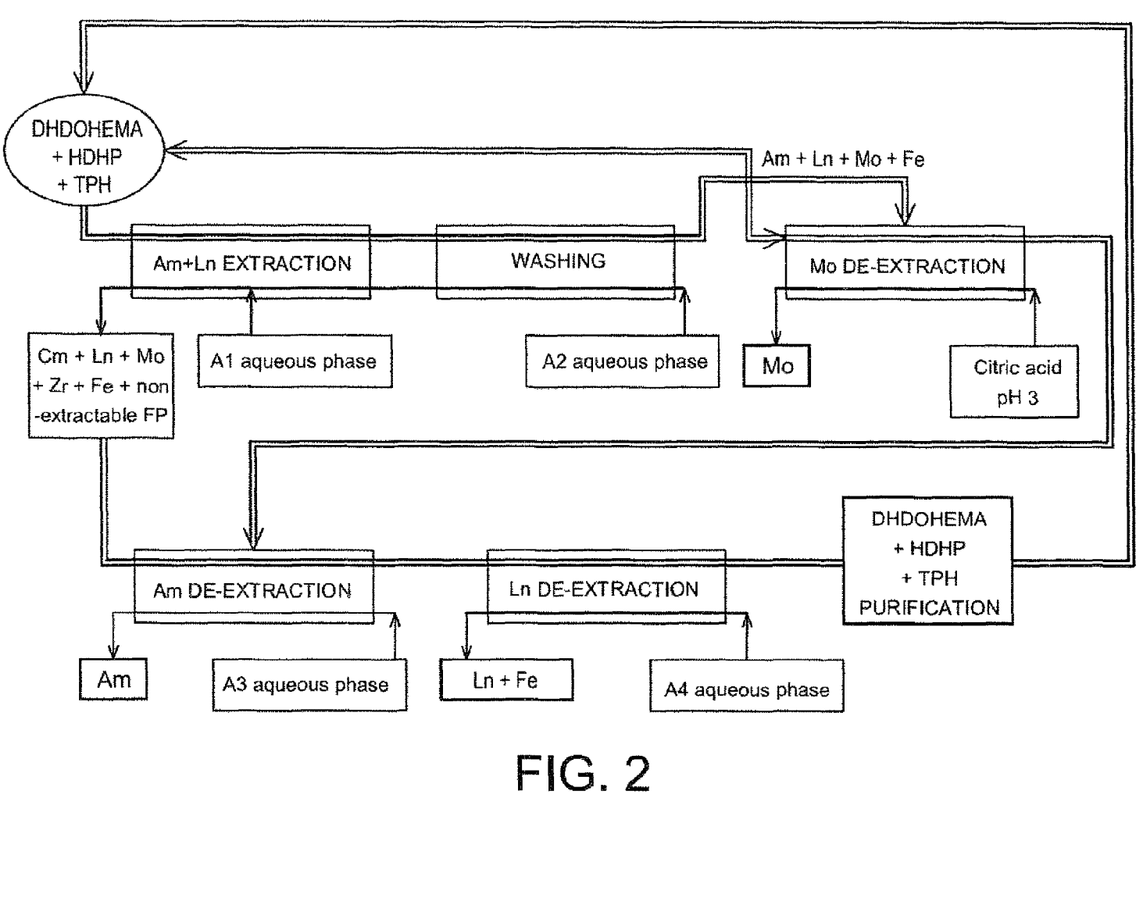
FIG. 2 is a block diagram of a second exemplary embodiment of the method of the invention.

In the exemplary embodiments illustrated in FIGS. 1 and 2, all the extraction, washing, de-extraction and re-extraction operations are carried out in multi-stage extractors of the type; mixers-decanters, pulsed columns or centrifugal extractors.

The organic phase flows entering or exiting these apparatuses are symbolized by a double solid line, while the aqueous phase flows entering or exiting said apparatuses are symbolized by a single solid line.

DETAILED DESCRIPTION OF THE PREFERRED EMBODIMENT

Example 1

Detailed Discussion of a First Exemplary Embodiment of the Method of the Invention Reference is made to FIG. 1 which schematically illustrates a first exemplary embodiment of the invention, designed in order to process, on an industrial scale a raffinate stemming from the first purification cycle of a PUREX or COEX™ method with view to selectively recovering the americium present in this raffinate.

The latter, designated hereafter and in FIG. 1 by A1 aqueous phase, consists in an aqueous solution with strong nitric acidity, which contains americium, curium, lanthanides (La, Ce, Pr, Nd, Sm, Eu, Gd, fission products other than lanthanides (Mo, Zr, Ru, Rd, Pa, Y, . . . ) as well as other metal elements which are neither lanthanides nor fission products such as iron and chromium.

On the other hand, it is free of uranium, plutonium and neptunium or, if any of these elements is present, it is only present in trace amounts, i.e. with a mass content of less than about 0.30%.

In this first example, the method is applied in the form of a succession of cycles each comprising the eight following steps:
  1) extracting the americium and a part of the lanthanides present in the A1 aqueous phase with an organic phase only containing as an extractant, a solvating extractant;
  2) washing the organic phase stemming from this extraction;
  3) adding an acid extractant to the organic phase stemming from this washing;

4) selectively de-extracting americium from the organic phase thereby enriched in acid extractant;

5) de-extracting the lanthanides present in the organic phase stemming from the de-extraction of americium;

6) de-extracting the acid extractant from the organic phase stemming from the de-extraction of the lanthanides;

7) purifying the organic phase only containing as an extractant the solvating extractant; and 8) re-extracting the acid extractant in a fraction of the thereby purified organic phase.

In the first step (designated as « Am+Ln extraction » in FIG. 1) the aqueous phase is circulated in a first extractor, as a counter current to an organic phase, non-miscible with water, which contains a solvating extractant capable of extracting more strongly americium than curium from a concentrated nitric medium, in an organic diluent.

This solvating extractant is preferably a malonamide, in this case DMDOHEMA, which is typically used in a concentration from 0.5 to 0.7 mol/L, for example 0.65 mol/L.

The organic diluent is TPH.

Before or upon introducing it into the first extractor, the nitric acidity of the A1 aqueous phase is, if necessary, rectified so that it is preferably located between 3 and 5 mol/L, for example 4 mol/L.

Moreover, the A1 aqueous phase is added with two complexing agents, i.e. a polyaminocarboxylic acid, in this case HEDTA, at a concentration typically from 0.01 to 0.1 mol/L, and oxalic acid at a concentration typically from 0.01 to 0.5 mol/L.

In the second step (designated as « washing » in FIG. 1), the organic phase stemming from the first extractor is circulated in a second extractor, as a counter-current to an A2 aqueous phase typically containing from 2 to 3 mol/L of nitric acid, for example 2.4 mol/L, and the same complexing agents in the same ranges of concentrations, as the A1 aqueous phase.

By suitably selecting the ratios between the flow rates at which the organic and aqueous phases circulate in each of the first and second extractors and the number of stages of these extractors (see Example 3), an organic phase is thereby obtained at the end of this second step, a phase in which are found the totality or quasi-totality of the americium, a part of the cerium and of the praseodymium as well as very small amounts of lanthanum, samarium and neodymium, and an aqueous phase in which are found the totality or quasi-totality of the curium, the remainder of the cerium, of the praseodymium, of the lanthanum of the samarium and of the neodymium, as well as the totality of all the other metal elements which were present in the A1 aqueous phase.

The aqueous phase from this second step is sent back towards the first extractor where it meets the A1 aqueous phase and is added to it, while the organic phase is directed towards a third extractor in which the third step and the fourth step (designated as « Am De-extraction » in FIG. 1) are carried out simultaneously.

Indeed, in the third extractor, the organic phase is:
- on the one hand, added with an organic phase of the same composition as the one used for carrying out the first step but which further contains an acid extractant, in this case a HDHP, at a concentration typically from 0.1 to 0.5 mol/L, for example of the order of 0.3 mol/L; and
- on the one hand, circulated as a counter-current to an A3 aqueous phase in order to selectively de-extract americium.

This aqueous phase contains a polyaminocarboxylic acid, in this case DTPA, with a concentration typically from 0.01 to 0.1 mol/L, as well as a carboxylic or hydroxycarboxylic acid capable of playing both the role of a complexing agent and that of a buffer, in this case, glycolic acid, at a concentration typically from 0.1 to 1 mol/L.

Its pH is preferably adjusted to a value comprised between 2 and 4, for example 3, by adding a base such as soda.

At the end of this, an aqueous phase is obtained which only contains as a metal element, americium and an organic phase in which are found the cerium, praseodymium, lanthanum, samarium and neodymium having been partly extracted during the first step.

In the fifth step (designated as « Ln De-extraction » in FIG. 1), the organic phase is circulated in a fourth extractor, as a counter-current to an A4 aqueous phase which typically contains from 0.5 to 1 mol/L of nitric acid and, optionally a diglycolamide, at a concentration typically from 0.01 to 0.5 mol/L.

At the end of this fifth step, an organic phase is thereby obtained which no longer contains any of the metal elements with which it was loaded during the first step but which contains, in addition to the solvating extractant and the acid extractant, a certain number of impurities and of degradation products, notably from radiolysis, which have accumulated during the previous steps.

In the sixth step (designated as « HDHP De-extraction » in FIG. 1), the organic phase is circulated in a fifth extractor, as a counter-current to an aqueous solution with a pH of more than 7, for example a solution of a hydroxide such as soda or hydrazine, of a carbonate such as sodium carbonate, of an amine or of a hydroxylamine.

Next, in the seventh step (designated as « DMDOHEMA+ TPH Purification » in FIG. 1), the organic phase thereby relieved of HDHP is circulated in a sixth extractor, as a counter-current to an aqueous solution of a strong base or of a salt of a strong base, with a pH at least equal to 8, such as a solution of soda or sodium carbonate, and is optionally subject to one or more filtrations if it contains a precipitate.

In the eight step (designated as « HDHP Re-extraction » in FIG. 1), the thereby purified organic phase is divided into two fractions: a first fraction representing 75 to 95% (v/v) of this phase and a second fraction representing 5 to 25% (v/v) of said phase and in which HDHP is re-extracted.

This re-extraction may for example be achieved by acidifying the basic aqueous solution having been used for removing the HDHP from the organic phase, by adding a 4 to 5 M nitric acid solution, and by circulating this thereby acidified solution in a seventh extractor, as a counter-current to an organic phase fraction in which re-extraction of this extractant is desired.

The organic phase is thus recovered in the form of two fractions, one of which only containing DMDOHEMA in TPH and the other one of which containing both DMDOHEMA and HDHP in TPH.

These fractions may then be re-used, respectively in the first step and in the third step of the next cycle.

Example 2

Detailed Discussion of a Second Exemplary Embodiment of the Method of the Invention Reference is now made to FIG. 2 which schematically illustrates a second exemplary embodiment of the method of the invention, which is also designed for treating on an industrial scale a raffinate stemming from the first purification cycle of a PUREX or COEX™ method with view to selectively recovering the americium present in this raffinate, but in which the acid extractant is present in the organic phase in all the steps of the method.

Also, in this second example, each cycle of the method comprises the following six steps:

1) extracting americium and a part of the lanthanides present in the A1 aqueous phase with an organic phase containing both the solvating extractant and the acid extractant;
2) washing the organic phase stemming from this extraction;
3) selectively de-extracting the molybdenum from the organic phase stemming from this washing;
4) selectively de-extracting the americium from the organic phase thus having been rid of molybdenum;
5) de-extracting the lanthanides present in the organic phase stemming from the de-extraction of americium; and
6) purification of the organic phase.

In the first step (designated as « Am+Ln extraction » in FIG. 2), the aqueous phase is circulated in a first extractor, as a counter-current to an organic phase containing both the solvating extractant and the acid extractant in TPH.

The solvating extractant is DMDOHEMA as in Example 1, which is also used at a concentration typically from 0.5 to 0.7 mol/L, for example 0.6 mol/L, while the acid extractant is HDEHP, which is used at a concentration typically from 0.1 to 0.5 mol/L, for example 0.3 mol/L.

Like in Example 1, the nitric acidity of the A1 aqueous phase is, if necessary, adjusted before or during its introduction into the first extractor so that it is located, preferably between 2 and 6 mol/L, for example 4 mol/L.

Moreover, it is added with two complexing agents, i.e. HEDTA as in Example 1, but which is here at a higher concentration, typically 0.05 mol/L, and a diglycolamide, in this case TEDGA, at a concentration typically from 0.01 to 0.5 mol/L, for example 0.05 mol/L.

In the second step (designated as « washing » in FIG. 2), the organic phase from the first extractor is set so as to circulate in a second extractor, as a counter-current to an A2 aqueous phase, which typically contains from 4 to 6 mol/L of nitric acid, for example 5 mol/L, and the same complexing agents, in the same ranges of concentrations as the A1 aqueous phase.

By suitably selecting the ratios between the flow rates at which the organic and aqueous phases circulate in each of the first and second extractors and the number of stages of these extractors (see Example 3), an organic phase is thereby obtained at the end of this second step, a phase in which are found the totality or quasi-totality of the americium, cerium, lanthanum, praseodymium, neodymium, molybdenum and iron as well as a small amount of zirconium, and an aqueous phase in which the remainder of the zirconium and the totality or quasi-totality of all the other elements which were present in the A1 aqueous phase including curium are found.

The aqueous phase from the second step is sent back towards the first extractor where it meets the A1 aqueous phase and is added to it, while the organic phase is directed towards a third extractor in which the third step (designated as « Mo De-extraction » in FIG. 2) is carried out.

To do this, said organic phase is circulated in the third extractor, as a counter-current to an aqueous solution containing a complexing agent, in this case citric acid, at a concentration typically from 0.1 to 1 mol/L and the pH of which is adjusted to a value comprised between 2 and 4, for example 3, by adding a base such as soda.

An aqueous phase loaded with molybdenum and an organic phase cleared of this element are thereby obtained at the end of this third step.

In the fourth step (designated as « Am De-extraction » in FIG. 2), the organic phase is circulated in a fourth extractor, as a counter-current to an A3 aqueous phase which contains a polyaminocarboxylic acid, in this case HEDTA, at a concentration typically from 0.01 to 0.5 mol/L, as well as a carboxylic or hydroxycarboxylic acid capable of both playing the role of a complexing agent and that of a buffer, in this case glycolic acid at a concentration typically from 0.1 to 1 mol/L, and the pH of which is preferably adjusted to a value comprised between 2 and 4, for example 3, by adding a base such as soda.

At the end of this fourth step, an aqueous phase is thus obtained which only contains as a metal element, americium, and an organic phase in which cerium, lanthanum, praseodymium, neodymium and iron are found, it being understood that the molybdenum was de-extracted during the third step.

In the fifth step (designated as « Ln De-extraction » in FIG. 2), this organic phase is circulated in a fourth extractor, as a counter-current to an A4 aqueous phase which typically contains from 0.5 to 1 mol/L of nitric acid and two complexing agents, i.e. a diglycolamide, in this case TEDGA, which is typically used at a concentration from 0.01 to 0.5 mol/L, and optionally oxalic acid which is typically used at a concentration from 0.01 to 0.8 mol/L.

At the end of this fifth step, an organic phase is thereby obtained which no longer contains any of the metal elements with which it was loaded during the first step but which contains, in addition to the solvating extractant and the acid extractant, a certain number of impurities and of degradation products, notably from radiolysis, which have accumulated during the previous steps.

In the sixth step (designated as « DMDOHEMA+ HDEHP+TPH Purification » in FIG. 2), this organic phase is purified in the same way as in Example 1.

The thereby purified organic phase may then be re-used in the first step of the next cycle.

Example 3

Validation of Examples 1 and 2

In the following, the distribution coefficients of the metal elements were determined:
in the case of americium and curium, by calculating the ratio of the activity of these elements in a given organic phase to the activity of these same elements in the aqueous phase having been put into contact with this organic phase;
in the case of the other metal elements, by calculating the difference between the initial and final concentrations of these elements in a given aqueous phase, and by calculating the ratio between this difference and the initial concentration of these same elements in this same aqueous phase.

All the measurements of activity of americium and curium were carried out by α spectrometry while all the measurements of concentration of the other metal elements were carried out by atomic emission spectrometry with an inductively coupled plasma, also known under the acronym of ICP-AES.

1) Validation of the First Exemplary Embodiment:
Extraction of Americium and of a Part of the Lanthanides/ Washing the Organic Phase:
These steps were validated by tests in tubes, completed by calculations based on the obtained results within the scope of these tests.

The tube tests were carried out by using:

as an organic phase: a phase formed with 0.65 mol/L of DMDOHEMA in TPH;

as an A1 aqueous phase: a solution simulating a raffinate from the processing with the PUREX method of an irradiated nuclear fuel of the UOX3 type (except for curium which is only present in trace amounts), and to which were added 0.01 mol/L of oxalic acid and 0.01 mol/L of HEDTA; and as an A2 aqueous phase: a solution with nitric acidity equal to 2.4 M and containing 0.01 mol/L of oxalic acid and 0.01 mol/L of HEDTA.

The nitric acidity of the A1 aqueous phase is 4.2 mol/L and its qualitative and quantitative composition of metal elements is given in the Table 1 hereafter. All these elements were dissolved in the form of nitrates.

TABLE I

| Elements | Concentrations | |
|---|---|---|
| | mM | mg/L |
| Am | 0.73 | 170 |
| Cm | $1.4.10^{-5}$ | $3.4.10^{-3}$ |
| Y | 1.7 | 150 |
| La | 2.9 | 410 |
| Ce | 5.7 | 790 |
| Pr | 2.6 | 370 |
| Nd | 9.4 | 1360 |
| Sm | 1.8 | 270 |
| Eu | 0.34 | 52 |
| Gd | 0.32 | 50 |
| Pd | 5.0 | 530 |
| Zr | 13 | 1190 |
| Mo | 12 | 1130 |
| Fe | 1.8 | 100 |

The organic phase, acid-balanced beforehand by adding 3 M nitric acid, was put into contact with the A1 aqueous phase, in an amount of 1.3 volume of A1 aqueous phase for 1 volume of organic phase, and with the A2 aqueous phase, in an amount of 3.1 volumes of A2 aqueous phase for 1 volume of organic phase, and left for ten minutes with stirring at a constant temperature of 25° C.

After decantation and separation of the aqueous and organic phases, the activities of the americium and curium were measured in each of these phases while the concentrations of the other metal elements were measured in the single aqueous phase.

And then, the organic phase was put into contact with the A2 aqueous phase, in an amount of 1 volume of organic phase for 3.1 volumes of aqueous phase, and both phases were left for 10 minutes with stirring at a constant temperature of 25° C.

There also, after decantation and separation of these phases, the activities of the americium and the curium were measured in each of them while the concentrations of the other metal elements were measured only in the single aqueous phase.

Table II hereafter shows the distributions coefficients $D_M$, the extraction factors $E_M$ and the separation factors $FS_{Am/M}$ obtained from the thereby measured activities and concentrations.

TABLE II

| Elements | Extraction | | | Washing | | |
|---|---|---|---|---|---|---|
| | $D_M$ | $E_M$ | $FS_{Am/M}$ | $D_M$ | $E_M$ | $FS_{Am/M}$ |
| Am | 6.2 | 1.43 | 1 | 4.5 | 1.44 | 1 |
| Cm | 4.1 | 0.94 | 1.5 | 2.8 | 0.90 | 1.6 |
| Y | 1.2 | 0.28 | 5.2 | 0.9 | 0.29 | 5.0 |
| La | 3.6 | 0.83 | 1.7 | 2.6 | 0.83 | 1.7 |
| Ce | 4.7 | 1.08 | 1.3 | 3.4 | 1.09 | 1.3 |
| Pr | 4.3 | 0.99 | 1.4 | 3.1 | 0.99 | 1.5 |
| Nd | 3.6 | 0.83 | 1.7 | 2.6 | 0.83 | 1.7 |
| Sm | 4.1 | 0.94 | 1.5 | 2.9 | 0.93 | 1.6 |
| Eu | 3.3 | 0.76 | 1.9 | 2.4 | 0.77 | 1.9 |
| Gd | 2.2 | 0.51 | 2.9 | 1.6 | 0.51 | 2.8 |
| Pd | 0.8 | 0.18 | 7.7 | 0.6 | 0.19 | 7.5 |
| Zr | 0.4 | 0.09 | 14.0 | 0.3 | 0.10 | 15 |
| Mo | 0.9 | 0.21 | 6.6 | 0.6 | 0.19 | 7.5 |
| Fe | 2.1 | 0.48 | 2.9 | 1.5 | 0.48 | 3.0 |

Calculations performed from the distribution coefficients and from the extraction factors shown in this table, show that it is possible to obtain on an industrial scale, very good separation between these elements by using extractors including a sufficient number of stages.

Thus, for example, a scheme consisting of using:

a 24-stage extractor for the extraction step coupled with a 24-stage extractor for the washing step;

the same acidities and those used for the tube tests;

the same extractant (DMDOHEMA) and the same complexing agents (HEDTA+oxalic acid) as those used for the tube tests and in the same concentrations; and ratios of O/A flow rates propartal to the ratios of volumes used for the tube tests, i.e. ratios of O/A flow rates of 0.23 for the extraction step and of 0.32 for the washing step;

leads to the distributions shown in Table III hereafter.

TABLE III

| Elements | Aqueous phase from the extraction | Organic phase from the washing |
|---|---|---|
| Am | 0.05% | 99.95% |
| Cm | 99.80% | 0.20% |
| Y | 100% | 0% |
| La | 99.55% | 0.45% |
| Ce | 22.16% | 77.84% |
| Pr | 70.64% | 29.36% |
| Nd | 99.56% | 0.44% |
| Sm | 99.11% | 0.89% |
| Eu | 100% | 0% |
| Gd | 100% | 0% |
| Pd | 100% | 0% |
| Zr | 100% | 0% |
| Mo | 100% | 0% |
| Fe | 100% | 0% |

Thus, the americium is again found in the organic phase from the washing at more than 99.95% with about 78% of cerium, 29% of praseodymium, but with only 0.2% of curium and 0.4 to 0.9% of lanthanum, neodymium and samarium. The other fission products themselves remain in the aqueous phase.

De-Extraction of the Americium:

This step was validated by two tests which were carried out by using:

an organic phase simulating the organic phase which would be obtained by applying the calculated scheme which has just been described, therefore containing 0.4 mol/L of nitric acid, americium, lanthanum, cerium, praseodymium, neodymium and samarium and to which were added 0.15 mol/L of HDHP; and as an A3 aqueous phase: a solution containing 0.05 mol/L of DTPA and 1 mol/L of glycolic acid, and the pH of which was adjusted to 3 by adding soda.

Both of these phases were put into contact with each other, volume to volume, $1/25^{th}$ of the volume of the aqueous phase stemming from the addition of a small volume of 10 M soda. The addition of this small volume of soda is intended to partly neutralize the nitric acidity of the organic phase so that the pH of the A3 aqueous phase may remain, after the contacting of both phases, close to 3 and, thus in the range of acidities for which the DTPA/glycolic acid selectively complexes americium.

The organic and aqueous phases were left for 10 minutes with stirring at a constant temperature of 25° C. Next, after separation of these phases by decantation, the activity of the americium was measured in each of them, while the concentrations of the other metal elements were measured only in the aqueous phase.

Table IV hereafter shows the distribution coefficients $D_M$ as well as the separation factors $FS_{M/Am}$ obtained from the thereby measured activities and concentrations.

TABLE IV

| Elements | $D_M$ | $FS_{M/Am}$ |
|---|---|---|
| Am | 0.06 | 1 |
| La | 21 | 350 |
| Ce | 13 | 217 |
| Pr | 4 | 67 |
| Nd | 1.7 | 28 |
| Sm | 1.9 | 32 |

The obtained distribution coefficients are quite satisfactory since they should give the possibility of obtaining on an industrial scale, a de-extraction of the totality of the americium while maintaining the lanthanides in the organic phase by using a ratio of O/A flow rates of about 2.

Further, the separation factors are all greater than 20, which is greatly sufficient for obtaining separation of the americium from the lanthanides by using an extractor comprising a limited number of stages, for example 16 stages.

De-Extraction of the Lanthanides:

This step was validated by tube tests which were conducted by using:

an organic phase such as the one obtained at the end of the tube tests dealing with de-extraction of the americium; and as an A4 aqueous phase: either a 1 M nitric acid aqueous solution or a 0.5 M nitric acid solution containing 0.2 mol/L of TEDGA.

Both of these phases were put into contact with each other, volume to volume, and left for 10 minutes with stirring at a constant temperature of 25° C.

Next, after decantation and separation of these phases, the concentrations of lanthanum, cerium, praseodymium, neodymium and samarium were measured in the sole aqueous phase.

Table V hereafter shows for each type of A4 aqueous phase, the distribution coefficients $D_M$ obtained from the thereby measured concentrations.

TABLE V

| Lanthanides | $D_M$ A4 = HNO$_3$ 1M | $D_M$ A4 = HNO$_3$ 0.5M + TEDGA 0.2M |
|---|---|---|
| La | 0.4 | 0.06 |
| Ce | 0.6 | 0.03 |
| Pr | 0.6 | 0.02 |
| Nd | 0.6 | 0.01 |
| Sm | 0.6 | 0.01 |

These distribution coefficients are quite satisfactory since they should give the possibility of obtaining on an industrial scale, quantitative de-extraction of the lanthanides by using an extractor comprising at most 8 stages and a ratio of the organic over aqueous phase flow rates of 0.5 or 6.5 depending on whether the aqueous phase used is a 1 M nitric acid aqueous solution or a 0.5 M nitric acid solution containing 0.2 mol/L of TEDGA. The benefit of using this second type of phase is to considerably reduce the generated volume of aqueous flow.

2) Validation of the Second Exemplary Embodiment:

Extraction of the Americium and of a Part of the Lanthanides/Washing of the Organic Phase:

This step was validated by two tests and by calculations based on the results obtained within the scope of these tests.

The tube tests were conducted by using:

as an organic phase: a phase containing 0.6 mol/L of DMDOHEMA and 0.3 mol/L of HDEHP in TPH;

as an A1 aqueous phase: a solution with a nitric acidity equal to 4 M, with a qualitative and quantitative composition identical with the one shown in Table 1 hereinbefore and to which were added 0.05 mol/L of TEDGA and 0.05 mol/L of HEDTA; and as an A2 aqueous phase: a solution of nitric acid equal to 5 M and containing 0.07 mol/L of TEDGA and 0.05 mol/L of HEDTA.

The organic phase, acid-balanced beforehand by adding 4 M nitric acid, and the A1 aqueous phase were put into contact with each other, volume to volume, and left for 10 minutes with stirring at a constant temperature of 25° C.

After decantation and separation of the organic and aqueous phases, the activities of the americium and of the curium were measured in each of these phases, while the concentrations of the other metal elements were measured in the sole aqueous phase.

Next, the organic phase was put into contact with the A2 aqueous phase, volume to volume, and these phases were left for 10 minutes with stirring at a constant temperature of 25° C.

There also, after decantation and separation of the organic and aqueous phases, the activities of the americium and of the curium were measured in each of these phases, while the concentrations of the other metal elements were measured in the sole aqueous phase.

Table VI hereafter shows the distribution coefficients $D_M$, the extraction factors $E_M$ and the separation factors $FS_{Am/M}$ obtained from the thereby measured activities and concentrations.

TABLE VI

| | Extraction | | | Washing | | |
|---|---|---|---|---|---|---|
| Elements | $D_M$ | $E_M$ | $FS_{Am/M}$ | $D_M$ | $E_M$ | $FS_{Am/M}$ |
| Am | 3.4 | 1.4 | 1 | 0.52 | 1.6 | 1 |
| Cm | 1.9 | 0.76 | 1.8 | 0.21 | 0.63 | 2.5 |

TABLE VI-continued

| Elements | Extraction | | | Washing | | |
|---|---|---|---|---|---|---|
| | $D_M$ | $E_M$ | $FS_{Am/M}$ | $D_M$ | $E_M$ | $FS_{Am/M}$ |
| Y | 0.14 | 0.056 | 24 | 0.01 | 0.03 | 52 |
| La | 3.4 | 1.4 | 1 | 1.1 | 3.3 | 0.5 |
| Ce | 4.0 | 1.6 | 0.9 | 0.9 | 2.7 | 0.6 |
| Pr | 3.7 | 1.5 | 0.9 | 0.7 | 2.1 | 0.7 |
| Nd | 3.1 | 1.3 | 1.1 | 0.36 | 1.1 | 1.4 |
| Sm | 1.0 | 0.4 | 3.4 | 0.13 | 0.39 | 4 |
| Eu | 0.96 | 0.38 | 3.5 | 0.05 | 0.15 | 10 |
| Gd | 0.56 | 0.23 | 6.1 | 0.02 | 0.06 | 26 |
| Pd | 0.05 | 0.02 | 68 | 0.1 | 0.3 | 5.2 |
| Zr | 0.024 | 0.009 | 142 | 1.9 | 5.7 | 0.3 |
| Mo | 46 | 18 | 0.1 | 26 | 78 | 0 |
| Fe | 59 | 24 | 0.06 | 10 | 30 | 0.1 |

In the absence of TEDGA in the A1 aqueous phase, the factors of separation between the americium and the other metal elements are comparable with those indicated in Table II hereinbefore since, with strong nitric acidity, it is DMDOHEMA which is the predominant extractant for the americium, for the curium and for the lanthanides (III). HDEHP is predominant for extracting the molybdenum, zirconium and iron and plays a phase modifying role allowing DMDOHEMA to extract more cations than when it is used alone.

In the presence of TEDGA, it is observed that the separation factors are modified. The factors of separation between americium and curium, heavy lanthanides (Sm, Eu, Gd), yttrium and zirconium are increased. On the other hand, the factors of separation between americium and light lanthanides (La, Ce, Pr, Nd) are smaller than in the absence of TEDGA. This means that TEDGA allows not only enhancement of the factor of separation between americium and curium but also of the factors of separation between lanthanides with adjacent atomic number.

The comparison of the results respectively obtained for the extraction and washing shows that the use of a larger amount of TEDGA allows an increase in the factor of separation between americium and curium. Thus, by passing from a TEDGA content of 0.05 M (» extraction« column) to a TEDGA content of 0.07 M (« washing» column), the separation factor $FS_{Am/Cm}$ is increased by 40%. Moreover, the separation factor $FS_{Am/Eu}$ has more than doubled while the separation factor $FS_{Am/La}$ is reduced by half.

These results show that by means of TEDGA, there are less lanthanides which have a behavior close to that of americium, which reduces the risks of accumulation, of these elements by a de-extraction effect in the washing step and a re-extraction effect in the extraction step.

Further, the increase in the separation factor $FS_{Am/Cm}$ gives the possibility of contemplating a reduction in the number of stages required for performing extraction of the americium and washing of the organic phase stemming from this extraction as compared with what these same operations would require in the absence of TEDGA. Indeed, a separation factor $FS_{Am/Cm}$ passing from 1.6 (Table II) to 2.5 (Table VI) allows a reduction in the number of stages by a factor 2.

Thus, calculations carried out from the distribution coefficients and from the separation factors indicated in Table VI hereinbefore show that a scheme consisting of using:
- a 15-stage extractor for the extraction coupled with a 12-stage apparatus for the washing;
- the same acidities as those used for the tube tests;
- the same extractants (DMDOHEMA+HDEHP) and the same complexing agents (TEDGA+HEDTA) as those used for the tube tests and in the same concentrations; and
- ratios of O/A flow rates of 0.4 for the extraction and of 3 for the washing;

leads to the distributions shown in Table VII hereafter.

TABLE VII

| Elements | Aqueous phase from the extraction | Organic phase from the washing |
|---|---|---|
| Am | 0.05% | 99.95% |
| Cm | 99.92% | 0.07% |
| Y | 100% | 0% |
| La | 0.01% | 99.99% |
| Ce | 0.01% | 99.99% |
| Pr | 0% | 100% |
| Nd | 0.10% | 99.90% |
| Sm | 99.97% | 0.02% |
| Eu | 99.99% | 0.01% |
| Gd | 100% | 0% |
| Pd | 100% | 0% |
| Zr | 99.20% | 0.80% |
| Mo | 0% | 100% |
| Fe | 0% | 100% |

Thus, the americium is again found in the organic phase stemming from the washing, at more than 99.95% with about 100% of the lanthanum, cerium, praseodymium, neodymium, molybdenum and iron but with only 0.07% of the curium and 0.8% of the zirconium. The other fission products themselves remain in the aqueous phase stemming from the extraction.

De-Extraction of the Molybdenum:

This step was validated by tube tests which were conducted by using:
- an organic phase simulating the organic phase which would be obtained by applying the calculating scheme which has just been described, therefore containing 0.33 mol/L of nitric acid, americium, lanthanum, cerium, praseodymium, neodymium, zirconium, molybdenum and iron; and as an aqueous phase: a solution containing 0.2 mol/L of citric acid and the pH of which was adjusted to 3 by adding soda.

Both of these phases were put into contact with each other, volume to volume, $1/30^{th}$ of the volume of the aqueous phase stemming from the addition of a small volume of 10 M soda, intended to partly neutralize the nitric acid of the organic phase.

The organic and aqueous phases were left for 10 minutes with stirring at a constant temperature of 25° C. Next, after decantation and separation of these phases, the activity of the americium was measured in each of them, while the concentrations of the other metal elements were measured in the sole aqueous phase.

Table VIII hereafter shows the distribution coefficients $D_M$ as well as the separation factors $FS_{M/Mo}$ obtained from the thereby measured activities and concentrations.

TABLE VIII

| Elements | $D_M$ | $FS_{M/Mo}$ |
|---|---|---|
| Am | 19 | $9 \cdot 10^2$ |
| La | 40 | $2 \cdot 10^3$ |
| Ce | 47 | $2 \cdot 10^3$ |
| Pr | 67 | $3 \cdot 10^3$ |
| Nd | 60 | $3 \cdot 10^3$ |
| Zr | 513 | $2 \cdot 10^4$ |
| Mo | 0.02 | 1 |
| Fe | 15 | $7 \cdot 10^2$ |

As this table shows, the distribution coefficients of all the metal elements other than molybdenum are greater than 1 and the separation factors between these elements and molybdenum are all greater than 700.

It is therefore possible to contemplate the carrying-out on an industrial scale of selective de-extraction of the molybdenum with an extractor comprising a limited number of stages, for example 8 stages, and by using a ratio of O/A flow rates from 1 to 10, so as to generate an aqueous flow of small volume.

De-Extraction of the Americium:

This step was validated by tube tests which were conducted by using:
- an organic phase such as the one obtained at the end of the tube tests dealing with de-extraction of the molybdenum; and
- as an A3 aqueous phase: a solution containing 0.05 mol/L of HEDTA and 1 mol/L of glycolic acid, and the pH of which was adjusted to 3 by adding soda.

Both of these phases were put into contact with each other, volume to volume, and left for 10 minutes with stirring at a constant temperature of 25° C. Next, after decantation and separation of these phases, the activity of the americium was measured in each of them, while the concentrations of the other metal elements were measured in the sole aqueous phase.

Table IX hereafter shows the distribution coefficients $D_M$ as well as the separation factors $FS_{M/Am}$ obtained from the thereby measured activities and concentrations.

TABLE IX

| Elements | $D_M$ | $FS_{M/Am}$ |
|---|---|---|
| Am | 0.13 | 1 |
| La | 8.2 | 63 |
| Ce | 5.1 | 39 |
| Pr | 2.6 | 20 |
| Nd | 1.6 | 12 |
| Zr | 105 | 807 |
| Fe | 11 | 86 |

As this table shows, the distribution coefficients are greater than 1 for all the metal elements other than americium and the factors of separation between this elements and americium are all greater than 9.

It is therefore possible to contemplate the carrying out on an industrial scale of de-extraction of the americium by using an extractor comprising about 16 stages and a ratio of O/A flow rates from 0.5 to 2.

De-Extraction of the Lanthanides:

This step was validated by tube tests which were conducted by using:
- an organic phase such as the one obtained at the end of the tube tests dealing with de-extraction of the americium; and
- as an A4 aqueous phase: a solution with nitric acidity equal to 1 M and comprising 0.2 mol/L of TEDGA and 0.8 mol/L of oxalic acid.

Both of these phases were put into contact with each other, volume to volume, and left for 10 minutes with stirring at a constant temperature of 25° C. Next, after decantation and separation of these phases, the concentrations of the different metals were measured in the sole aqueous phase.

Table X hereafter shows the distribution coefficients $D_M$ obtained from the thereby measured concentrations.

TABLE X

| Elements | $D_M$ |
|---|---|
| La | 0.003 |
| Ce | 0.001 |
| Pr | 0.001 |
| Nd | 0.001 |
| Zr | 0.002 |
| Fe | 0.015 |

The obtained distribution coefficients are quite satisfactory since they should give the possibility of obtaining on an industrial scale quantitative de-extraction of the lanthanides, iron and zirconium by using an extractor comprising about four stages and a ratio of A/O flow rates of the order of 0.1.

QUOTED REFERENCES

[1] International PC Application WO 2007/135178
[2] French patent No. 2 731 717
[3] B. Weaver and F. A. Kappelmann, Report RNL-3559, 1964
[4] US Patent application No. 2007/0009410
[5] P. Baron, M. Lecomte, B. Boullis and D. Warin, « Separation of the Long Lived Radionuclides: Current Status and Future R&D Program in France », Proceedings of Global 2003, New Orleans, La., November 2003, p. 508-511.
[6] French patent No. 2 845 616

What is claimed is:

1. A method for selective recovery of americium from an A1 aqueous phase which contains at least 0.5 mol/L of nitric acid, americium, curium and fission products including lanthanides, but which is free of uranium, plutonium and neptunium or which only contains these three last elements in trace amounts, the method comprises at least the following steps:

a) extracting the americium and a part of the lanthanides from the A1 aqueous phase, by circulating the A1 aqueous phase in a first extractor, as a counter-current to an organic phase non-miscible with water, which contains a solvating extractant capable of extracting more americium than curium from an acid aqueous phase, and optionally an acid extractant, in an organic diluent;

b) washing the organic phase stemming from step a), by circulating this organic phase in a second extractor, as a counter-current to an A2 aqueous phase which contains at least 0.5 mol/L of nitric acid;

c) optionally adding to the organic phase stemming from step b) some acid extractant if the latter is not already present in this phase;

d) selectively de-extracting the americium present in the organic phase stemming from step b) or step c), by circulating the organic phase stemming from b) in a third extractor as a counter-current to an A3 aqueous phase which has a pH at least equal to 1 and which contains one or several complexing agents; and e) de-extracting the lanthanides present in the organic phase stemming from step c), by circulating this organic phase in a fourth extractor, as a counter-current to an A4 aqueous phase which contains less than 1.5 mol/L of nitric acid;

and wherein the ratio between flow rates at which the organic phase and the A1 aqueous phase circulate in the first extractor and the ratio between flow rates at which the organic phase and the A2 aqueous phase circulate in the second extractor are selected so that the extraction factor for americium obtained in each of steps a) and b)

is greater than 1 and that the extraction factor for curium obtained in each of steps a) and b) is less than 1.

2. The method of claim 1, wherein the solvating extractant is selected from the group consisting of malonamides, carbamoylphosphine oxides, tri-isobutylphosphine sulfides, carbamoylphosphonates and mixtures thereof.

3. The method of claim 2, wherein the solvating extractant is a malonamide.

4. The method of claim 1, wherein the acid extractant is selected from a group consisting of mono- and di-alkylphosphoric acids, mono- and di-alkylphosphonic acids, mono- and di-alkylphosphinic acids, thiophosphoric acids, thiophosphonic acids, thiophosphinic acids, lipophilic carboxylic acids, sulfonic acids and mixtures thereof.

5. The method of claim 4, wherein the acid extractant is a dialkylphosphoric acid.

6. The method of claim 1, wherein the organic diluent is an aliphatic diluent.

7. The method of claim 1, wherein the A1 aqueous phase has a nitric acid content from 2 to 6-mol/L.

8. The method of claim 1, wherein the A1 aqueous phase contains one or more complexing agents selected from the group consisting of hydroxycarboxylic acids, polaminocarboxylic acids and diglycolamides.

9. The method of claim 8, wherein the A1 aqueous phase contains a diglycolamide.

10. The method of claim 9, wherein the diglycolamide is associated with a polyaminocarboxylic acid.

11. The method of claim 1, wherein the A2 aqueous phase has a nitric acid content from 2 to 6-mol/L.

12. The method of claim 8, wherein the A2 aqueous phase contains the same complexing agent(s) as those present in the A1 aqueous phase and in the same ranges of concentrations.

13. The method of claim 1, wherein the A3 aqueous phase is a solution containing a polyaminocarboxylic acid and a hydroxycarboxylic acid, and the pH of which is adjusted to a value from 2 to 4 by adding a base.

14. The method of claim 1, wherein the A4 aqueous phase is a solution containing from 0.5 to 1.5-mol/L of nitric acid and a diglycolamide, alone or in association with a carboxylic acid.

15. The method of claim 9, wherein the diglycolamide is tetraethyldiglycolamide.

16. The method of claim 1, wherein the organic phase used in step a) does not contain any acid extractant and the method comprises all the steps a) to e).

17. The method of claim 16, which comprises after step e), a step f) for separating both extractants.

18. The method of claim 17, wherein the separation of both extractants comprises de-extracting the acid extractant from the organic phase.

19. The method of claim 18, which comprises, after the step for separating both extractants, a step for purifying the organic phase.

20. The method of claim 19, which comprises, after the step for purifying the organic phase, a step for re-extracting the acid extractant in a fraction of the organic phase.

21. The method of claim 1, wherein the organic phase used in step a) contains the solvating extractant and the acid extractant and the method does not comprise any step c).

22. The method of claim 21, which comprises after step e), a step for purifying the organic phase.

23. The method of claim 1, wherein the A1 aqueous phase is a raffinate stemming from the first purification cycle of a PUREX or COEX™ method.

24. The method of claim 17, which comprises, after the step for separating both extractants, a step for purifying the organic phase.

25. The method of claim 14, wherein the diglycolamide is tetraethyldiglycolamide.

\* \* \* \* \*